(12) United States Patent
Parrett et al.

(10) Patent No.: US 11,314,100 B2
(45) Date of Patent: Apr. 26, 2022

(54) FORMING A HOMOGENIZED ILLUMINATION LINE WHICH CAN BE IMAGED AS A LOW-SPECKLE LINE

(71) Applicant: Cognex Corporation, Natick, MA (US)

(72) Inventors: Andrew Parrett, Boston, MA (US); John F. Filhaber, East Haddam, CT (US); Andrew Goodale, Maynard, MA (US); Laurent Belanger, Hudson, NH (US); Ronald Zimmerman, Boulder, CO (US)

(73) Assignee: Cognex Corporation, Natick, MA (US)

( * ) Notice: Subject to any disclaimer, the term of this patent is extended or adjusted under 35 U.S.C. 154(b) by 392 days.

(21) Appl. No.: 16/252,484

(22) Filed: Jan. 18, 2019

(65) Prior Publication Data

US 2019/0227336 A1 Jul. 25, 2019

Related U.S. Application Data

(60) Provisional application No. 62/619,675, filed on Jan. 19, 2018.

(51) Int. Cl.
*G02B 27/48* (2006.01)
*G01N 21/956* (2006.01)
(Continued)

(52) U.S. Cl.
CPC .............. *G02B 27/48* (2013.01); *G01B 11/25* (2013.01); *G01N 21/8806* (2013.01);
(Continued)

(58) Field of Classification Search
CPC .... G02B 27/48; G01B 11/25; G01N 21/8806; G01N 21/8901; G01N 21/956
(Continued)

(56) References Cited

U.S. PATENT DOCUMENTS 4,155,630 A 5/1979 Ih
6,323,984 B1 11/2001 Trisnadi
(Continued)

FOREIGN PATENT DOCUMENTS

CN 102326169 A 1/2012
CN 103597400 A 2/2014
(Continued)

OTHER PUBLICATIONS

Chinese Patent Application No. 201910049286.5, First Office Action dated Jul. 28, 2020, with translation (17 pages).
(Continued)

*Primary Examiner* — Jerry L Brooks
(74) *Attorney, Agent, or Firm* — Fish & Richardson P.C.

(57) ABSTRACT

A system for forming a homogenized illumination line which can be imaged as a low-speckle line is disclosed. The system includes a laser configured to emit a collimated laser beam; and an illumination-fan generator that includes one or more linear diffusers. The illumination-fan generator is arranged and configured to (i) receive the collimated laser beam, (ii) output a planar fan of diffused light, such that the planar fan emanates from a light line formed on the distal-most one of the one or more linear diffusers, and (iii) cause formation of an illumination line at an intersection of the planar fan and an object.

18 Claims, 6 Drawing Sheets

(51) Int. Cl.
*G02B 5/02* (2006.01)
*G01N 21/89* (2006.01)
*G01N 21/88* (2006.01)
*G01B 11/25* (2006.01)

(52) U.S. Cl.
CPC ....... *G01N 21/8901* (2013.01); *G01N 21/956* (2013.01); *G02B 5/0215* (2013.01); *G02B 5/0278* (2013.01); *G01N 2021/8908* (2013.01)

(58) Field of Classification Search
USPC .......................................................... 353/30
See application file for complete search history.

(56) References Cited

U.S. PATENT DOCUMENTS

| | | |
|---|---|---|
| 6,800,859 B1 | 10/2004 | Shishido et al. |
| 2002/0014577 A1 | 2/2002 | Ulrich et al. |
| 2002/0043561 A1* | 4/2002 | Tsikos ................ G06K 7/10594 235/454 |
| 2008/0297731 A1 | 12/2008 | Powell et al. |
| 2010/0053565 A1 | 3/2010 | Mizushima et al. |
| 2013/0242275 A1 | 9/2013 | Kilcher et al. |
| 2015/0160002 A1 | 6/2015 | Nayar |
| 2016/0313567 A1 | 10/2016 | Kurashige |
| 2017/0123053 A1 | 5/2017 | Stigwall et al. |
| 2017/0123218 A1* | 5/2017 | Stigwall ................ G02B 27/30 |

FOREIGN PATENT DOCUMENTS

| | | |
|---|---|---|
| CN | 103857982 A | 6/2014 |
| CN | 103869474 A | 6/2014 |
| CN | 104965307 A | 10/2015 |
| CN | 105210112 A | 12/2015 |
| CN | 105474090 A | 4/2016 |
| DE | 102016211339 A1 | 12/2016 |
| WO | WO2009077198 A1 | 6/2009 |
| WO | WO2012032668 A1 | 3/2012 |

OTHER PUBLICATIONS

Optotune Switzerland AG, "Compact and Reliable Speckle Reduction", Aug. 2017, 41 pages.
Sales et al., RPC Photonics, Inc., "Deterministic microlens diffuser for Lambertian scatter", presented at the SPIE 2006 Annual Meeting, San Diego, California, Aug. 30, 2006, 19 pages.
German Patent Application No. 10 2019 000 272.5, Examination Report dated Feb. 4, 2021 with machine translation, 7 pages.
Korean Patent Application No. 10-2019-0007556, Notice of Preliminary Rejection and Translation, dated May 26, 2020, 9 pages.
Japanese Patent Application No. 2019-007821, Notice of Reason(s) for Refusal, dated Mar. 17, 2020, 8 pages.

* cited by examiner

FORMING A HOMOGENIZED ILLUMINATION LINE WHICH CAN BE IMAGED AS A LOW-SPECKLE LINE

CROSS REFERENCE TO RELATED APPLICATIONS

This application claims the benefit of priority under 35 U.S.C. § 119(e)(1) of U.S. Provisional Application No. 62/619,675, filed on Jan. 19, 2018, which is incorporated by reference herein.

FIELD OF THE DISCLOSURE

Technologies are described for producing a planar sheet of laser light for illuminating an object, such that the illumination line formed at the intersection of the planar sheet with the object is homogenized and can be imaged as a de-speckled line.

BACKGROUND

Laser light is projected, in a sheet or fan, from a light source to an object where its intersection forms an illumination line. The illumination line is imaged, in many applications using a camera, to determine a level of a surface of the object relative a reference surface, or a profile of the object. The fidelity of an image of the illumination line is impacted negatively by sparkle or speckle. Sparkle is caused by spurious reflections of the laser light off a facetted surface of the object. Speckle is caused by the interference of coherent laser light with differing phase caused by reflections of the coherent light off an optically-rough surface of the object. These effects create an uneven and locally distorted image of the illumination line at (i) the camera acquiring the image of the illumination line, or (ii) viewer viewing the illumination line. As such, these effects can reduce the accuracy of laser light-based measurements of an object.

SUMMARY

Technologies described herein use a fan-shaped beam generator and a linear diffuser disposed between the light source and the object, such that each of the fan-shaped beam generator and the linear diffuser spreads, along a predetermined direction, light transmitted there through. The fan-shaped beam generator can itself be a linear diffuser, or can be one of a Powell lens or a cylindrical lens. Additionally, the fan-shaped beam generator and the linear diffuser can be moved relative to each other along the predetermined direction. In either of these cases, laser light transmitted through the fan-shaped beam generator and the linear diffuser is projected in a sheet or fan to an object where its intersection with the sheet or fan forms an illumination line that (i) is homogenized along the predetermined direction and (ii) has a Gaussian profile (or another profile associated with the laser light emitted by the source) perpendicular to the predetermined direction, regardless of variations in the height of the object over the span of the illumination line. In the case when the fan-shaped beam generator and the linear diffuser are moving relative to each other, the homogenized illumination line formed at the intersection of the sheet or fan with the object can be imaged (and/or observed) as a de-speckled line.

According to an aspect of the disclosed technologies, a system includes a laser configured to emit a collimated laser beam; and an illumination-fan generator that includes one or more linear diffusers. The illumination-fan generator is arranged and configured to (i) receive the collimated laser beam, (ii) output a planar fan of diffused light, such that the planar fan emanates from a light line formed on the distalmost one of the one or more linear diffusers, and (iii) cause formation of an illumination line at an intersection of the planar fan and an object.

The foregoing and other embodiments can each optionally include one or more of the following features, alone or in combination. In some implementations, the linear diffuser comprises one of a pseudorandom cylinder array or a holographic optical element.

In some implementations, the illumination-fan generator can include a fan-shaped beam generator, and a linear diffuser having a direction of diffusion. Here, the fan-shaped beam generator is arranged and configured to receive the collimated laser beam and form a fan-shaped beam that intersects the linear diffuser along the light line parallel to the direction of diffusion. Additionally, the linear diffuser transmits light corresponding to the light line to form the planar fan. In some cases, the fan-shaped beam generator can include a linear diffuser. In cases, the fan-shaped beam generator can include one of a cylindrical lens or a Powell lens. In some implementations, a divergence angle of a fan-shaped beam formed by the fan-shaped beam generator is larger than a target divergence angle. Additionally, a separation "d" between the fan-shaped beam generator and linear diffuser is larger than a predetermined separation to ensure that a length of a light line formed by the fan-shaped beam on the linear diffuser is larger than a target length "$L_X$". Here, the predetermined separation is proportional to the target divergence angle and the target length.

In some implementations, the system can include a driver configured to cause cyclical motion of the linear diffuser relative to the fan-shaped beam generator. Here, the cyclical motion is along a direction of diffusion of the linear diffuser. Further, the system can include an image acquisition device disposed such that its optical axis forms an acute angle to the planar fan of diffused light, and configured to form an image of the illumination line as a de-speckled image. Here, the de-speckled image includes an average of a sequence of images of instances of the illumination line formed during an exposure time interval. Furthermore, the driver is configured to deactivate the laser when a speed of the cyclical motion is below a predetermined speed, and the predetermined speed is inversely proportional to the exposure interval.

In some implementations, the illumination-fan generator can include a cylindrical-shell shaped linear diffuser arranged with its axis perpendicular to a direction of propagation of the collimated laser beam, and configured to (i) receive the collimated laser beam at an input portion of the cylindrical-shell shaped linear diffuser, (ii) form a fan-shaped beam that intersects an exit portion of the cylindrical-shell shaped linear diffuser along the light line parallel to the direction of diffusion, and (iii) transmit through the exit portion light corresponding to the light line to form the planar fan. In some implementations, a divergence angle of a fan-shaped beam formed by an input portion of the cylindrical-shell shaped linear diffuser is larger than a target divergence angle. Additionally, a diameter of the cylindrical-shell shaped linear diffuser is larger than a predetermined diameter to ensure that a length of a diffused-light contour formed by the fan-shaped beam on the exit portion of the cylindrical-shell shaped linear diffuser is larger than a target length "$L_X$". Here, the predetermined diameter is proportional to the target divergence angle and the target length.

In some implementations, the system can include a driver configured to cause rotation of the cylindrical-shell shaped linear diffuser about its axis, the rotation being along a direction of diffusion of the cylindrical-shell shaped linear diffuser. Further, the system can include an image acquisition device disposed such that its optical axis forms an acute angle to the planar fan of diffused light, and configured to form an image of an illumination line as a de-speckled image. Here, the de-speckled image includes an average of a sequence of images of instances of the illumination line formed during an exposure time interval.

In some implementations, the system can include an image acquisition device disposed such that its optical axis forms an acute angle to a planar fan of diffused light, and configured to form an image of the illumination line as a homogenized line.

Particular aspects of the disclosed technologies can be implemented to realize one or more of the following potential advantages. For example, in accordance with the disclosed technologies, the quality of the illumination line along the line and perpendicular to the line is better than what can be achieved using only a Powell lens without using the companion linear diffuser, as disclosed, because unwanted diffractive and refractive effects caused by the Powell lens can be transferred in the image of the illumination line. As another example, the fan of light produced in accordance with the disclosed technologies can be effectively Gaussian in the direction perpendicular to the fan plane, while in the fan plane, the illumination profile can be designed to satisfy various illumination profiles. As yet another example, the disclosed technologies effectively reduce the coherence of the laser light without impacting the quality of the illumination line in the direction perpendicular to the line direction. As yet another example, by using a fan-shaped beam generator followed by a linear diffuser, the power of a laser included in the light source can be increased without laser safety concerns due to the eye now viewing an extended (potentially high intensity) light source.

Details of one or more implementations of the disclosed technologies are set forth in the accompanying drawings and the description below. Other features, aspects, descriptions and potential advantages will become apparent from the description, the drawings and the claims.

Certain illustrative aspects of the disclosed technologies are described herein in connection with the following description and the accompanying figures. These aspects are, however, indicative of but a few of the various ways in which the principles of the disclosed technologies may be employed and the disclosed technologies are intended to include all such aspects and their equivalents. Other advantages and novel features of the disclosed technologies may become apparent from the following detailed description when considered in conjunction with the figures.

DETAILED DESCRIPTION

Figure 1A:
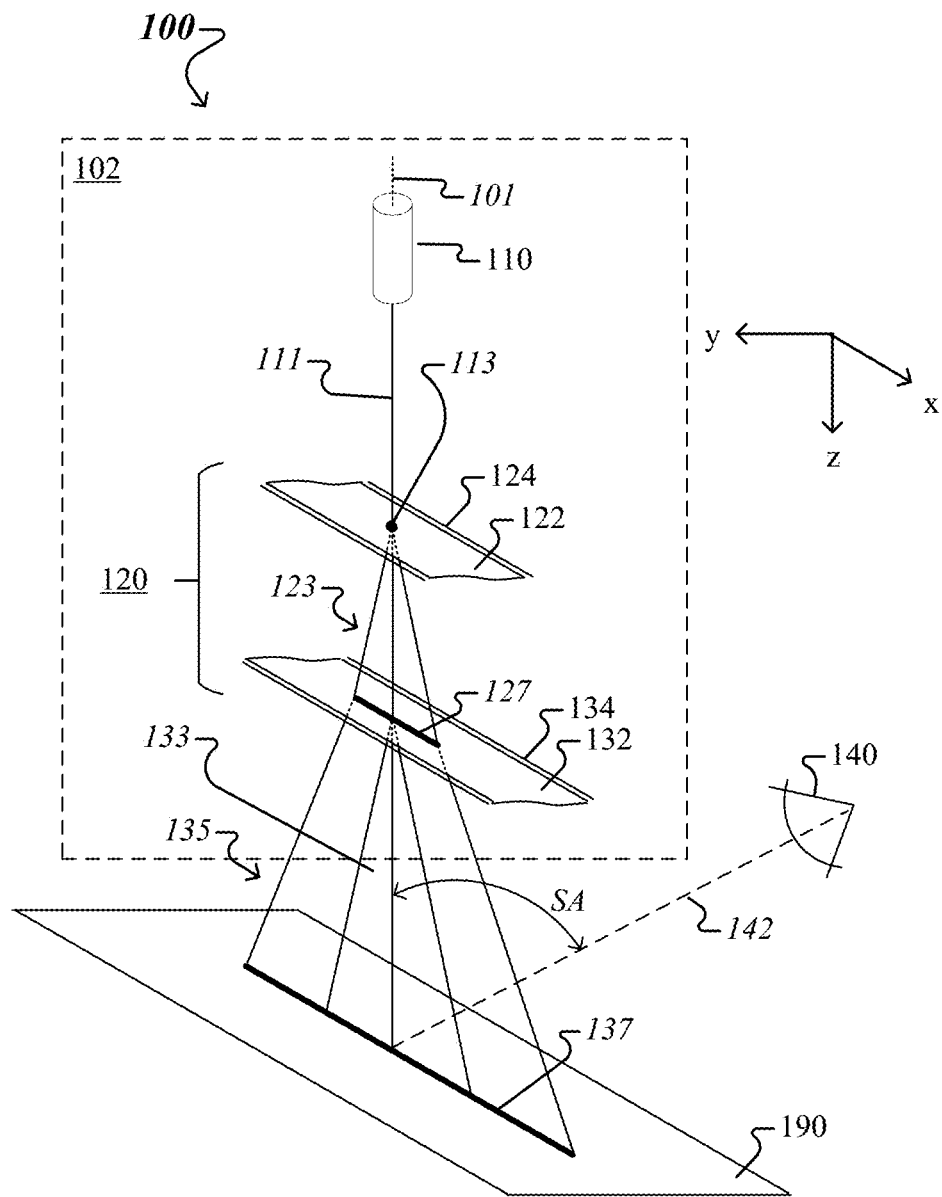
FIGS. 1A-1B show aspects of an example of a laser-based imager that forms a homogenized illumination line.

FIG. 1A shows an example of a laser-based imager 100 that uses a homogenized illumination line 137. The imager 100 includes a laser-based illumination-fan source 102 and an image acquisition device 140. The source 102 has an optical axis 101, here (for example) oriented along the z-axis, and is configured to output, along the optical axis and parallel to the (x,z) plane, a planar fan of diffused light 135. The planar fan 135 is projected onto an object 190 and forms the illumination line 137 at the intersection of the planar fan with the object. Note that the illumination line 137 follows a contour of the object 190, regardless of whether the object has a curved or flat surface.

The source 102 includes a laser 110 and an illumination-fan generator 120. The laser 110 is arranged and configured to emit laser light as a collimated laser beam 111 along the optical axis 101. A wavelength of the laser light emitted by the laser 110 can be in the range of 400-2000 nm. The illumination-fan generator 120 is arranged and configured to receive the collimated laser beam 111 and to produce the planar fan of diffused light 135.

The illumination-fan generator 120 includes a fan-shaped beam generator 122 having an optical axis common to the optical axis 101, and one or more linear diffusers having a direction of diffusion perpendicular to the optical axis 101, here (for example) along the x-axis. The fan-shaped beam generator 122 and the one or more linear diffusers are distributed along the optical axis 101. The fan-shaped beam generator 122 is arranged and configured to spread the collimated laser beam 111 along the x-axis as a fan-shaped beam 123. In the example shown in FIG. 1A, the illumination-fan generator 120 includes a single linear diffuser 132 that has a direction of diffusion that is perpendicular to the optical axis 101, here (for example) along the x-axis. Note that the fan-shaped beam generator 122 can itself be a linear diffuser that has a direction of diffusion along the x-axis, or can be one of a Powell lens or a cylindrical lens. In the latter case, each of the Powell lens or the cylindrical lens has optical power in the (y-z) plane and lacks optical power in the (x,z) plane. The fan-shaped beam generator 122 is supported by a first mount 124 and the linear diffuser 132 is supported by a second mount 134 spaced apart from the first mount, such that the fan-shaped beam generator 122 is disposed between the laser 110 and the linear diffuser 132.

The laser 110 projects the laser beam 111 onto the fan-shaped beam generator 122 as a beam spot 113. The fan-shaped beam generator 122 transmits light corresponding to the beam spot 113 to form a fan-shaped beam 123 parallel to the (x,z) plane. Note that when the fan-shaped beam generator 122 is implemented as a liner diffuser, the fan-shaped beam 123 is formed from transmitted light that is diffused along the x-axis (and not diffused along the y-axis). When the fan-shaped beam generator 122 is implemented as a Powell lens or a cylindrical lens, the fan-shaped beam 123 is formed from transmitted light that is redirected along the x-axis (and not redirected along the y-axis). As such, the fan-shaped beam generator 122 projects the fan-shaped beam 123 onto the linear diffuser 132 as a light line 127 along the x-axis. Note that when the fan-shaped beam generator 122 is implemented as a linear diffuser, the fan-shaped beam 123 of diffused light is projected on the linear diffuser 132 as a diffused light line 127. The linear diffuser 132 transmits light corresponding to the light line 127 to form the planar fan of diffused light 135 parallel to the (x,z) plane. Note that that planar fan 135 is a superposition of fan-shaped beams 133 (which are parallel to the (x,z) plane), each of the fan-shaped beams being formed by the linear diffuser 132 by diffusing light radiated from a corresponding point of the light line 127. As such, the linear diffuser 132 projects the planar fan of diffused light 135 onto the object 190 as the homogenized illumination line 137.

In some implementations, the linear diffuser 132 can be one of a linear diffusing random cylinder array (e.g., random in radius, numerical aperture (NA), and depth), pseudo-random engineered cylinder array, or holographic optical element, each of which are configured to provide the fan-shaped beams of diffused light 133 when light corresponding to points of the light line 127 transmits there through. Each fan-shaped beam 133 has a diffusion angle, here in the (x,z) plane, determined by the characteristics of the cylinder array, e.g., values of radius, NA, and depth, for instance. The fan-shaped beam generator 122, when implemented as a linear diffuser, can be configured in the same manner as the linear diffuser 132, or in a similar manner. Note that the fine structure and pseudo-random nature of the linear diffuser 132, and of the fan-shaped beam generator 122, when implemented as a linear diffuser, provides enhanced uniformity, along the x-axis, of the illumination line 137. At the same time, the profile along the y-axis of the illumination line 137 (as well of the diffused-light line 127) remains essentially the same as the profile along the y-axis of the beam spot 113.

Figure 4A:
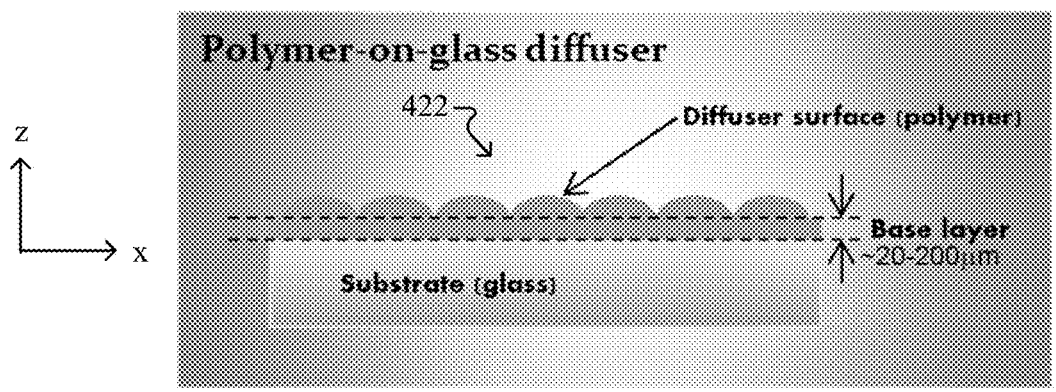
FIGS. 4A-4C show aspects of a linear diffuser that can be part of the laser-based imagers of FIGS. 1A, 2A and 3.
Figure 4B:
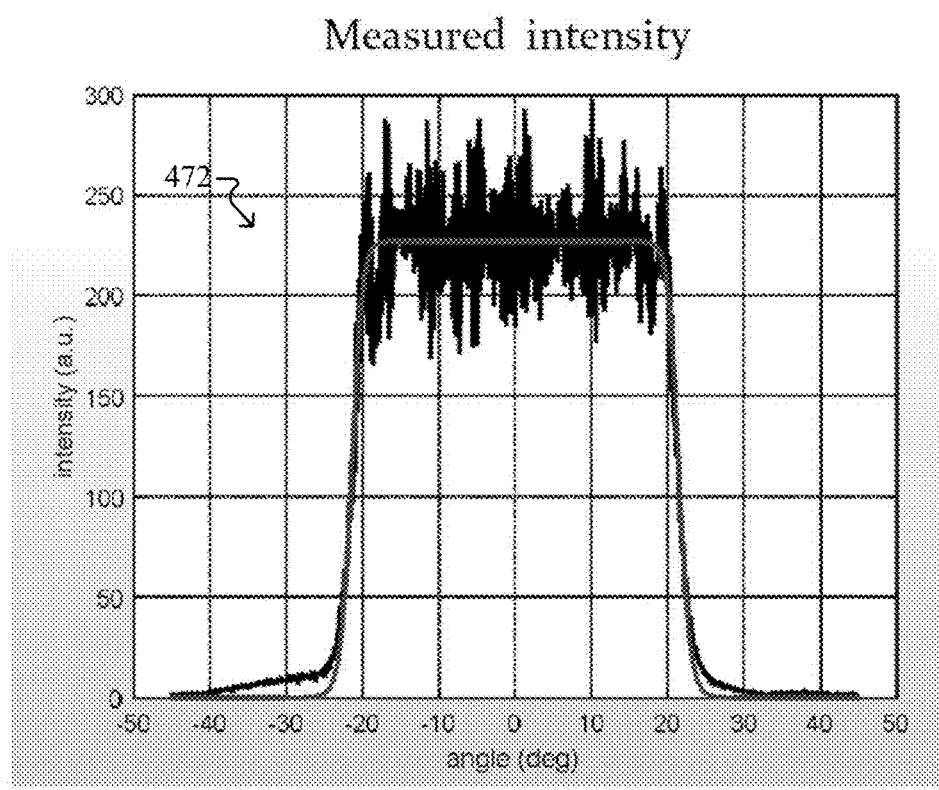
Figure 4C:
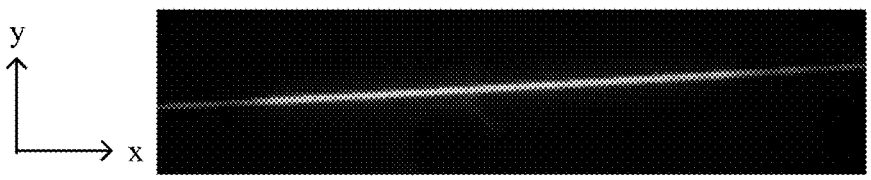

The disclosed linear diffuser 132, and in some implementations the linear diffuser used as the fan-shaped beam generator 122, can be implemented as an engineered diffuser, of appropriate parameters, from among the EDL (engineered diffuser line) series manufactured by RPC Photonics, Inc. of Rochester, N.Y. For example, FIG. 4A is a side view in the (x-z) plane of a linear diffuser 422 from the EDL series. Here, the linear diffuser surface varies along the x-axis (here, oriented in the left-right direction), but is constant along the y-axis (here, oriented in-out of the page.) FIG. 4B shows that the measured light intensity of the fan-shaped beam formed by EDL-40 has a top-hat angular profile 472. Here, the light intensity of the fan-shaped beam is substantially constant over an angular range of [−20°,+20°] relative the (y-z) plane, and drops abruptly (to substantially zero) for larger angles. More specifically, for an input beam spot having a diameter of 5 mm, and for a detector angle of 0.25°, the full-width at 90% (50%) is 39.9° (42.9°). FIG. 4B also shows that the scatter by the linear diffuser EDL-40 is relatively uniform within the fan-shaped beam. Other models allow a smaller divergence of the fan-shaped beam (e.g., down to +/−2°, for a total divergence of 4° for EDL-4) or greater divergence of the fan-shaped beam (e.g., up to +/−60°, for a total divergence of 120° for EDL-120). FIG. 4C is an image of a fan-shaped beam profile 474 which shows that, for the linear diffusers from the EDL series, the diffusion occurs exclusively along one direction (here along the x-axis) and virtually no diffusion occurs in the transverse direction (here along the y-axis). This ensures no thickening/broadening of the planar fan of diffused light 135 and thus of the illumination line 137.

Referring again to FIG. 1A, the image acquisition device 140 (e.g., a camera coupled with, or integrated into a common device housing with, the laser-based illumination-fan source 102) is arranged and configured to image the object 190 as illuminated with the homogenized illumination line 137. Here, an optical axis 142 of the image acquisition device 140 is arranged in the (y,z) plane and forms an acute angle SA (i.e., larger than 0 and less than 90°) with the optical axis 101 of the laser-based illumination-fan source 102. The image acquisition device 140 includes an image sensor and an optical subsystem that forms an image of the illumination line 137 on the image sensor. In some implementations, the planar fan of diffused light 135, a plane of the image sensor of the image acquisition device 140, and the acute angle SA satisfy the Scheimpflug condition. The image sensor of the image acquisition device 140 is configured to convert the image of the illumination line 137 into information for producing a digital image of the line-illuminated object 190.

Figure 1B:
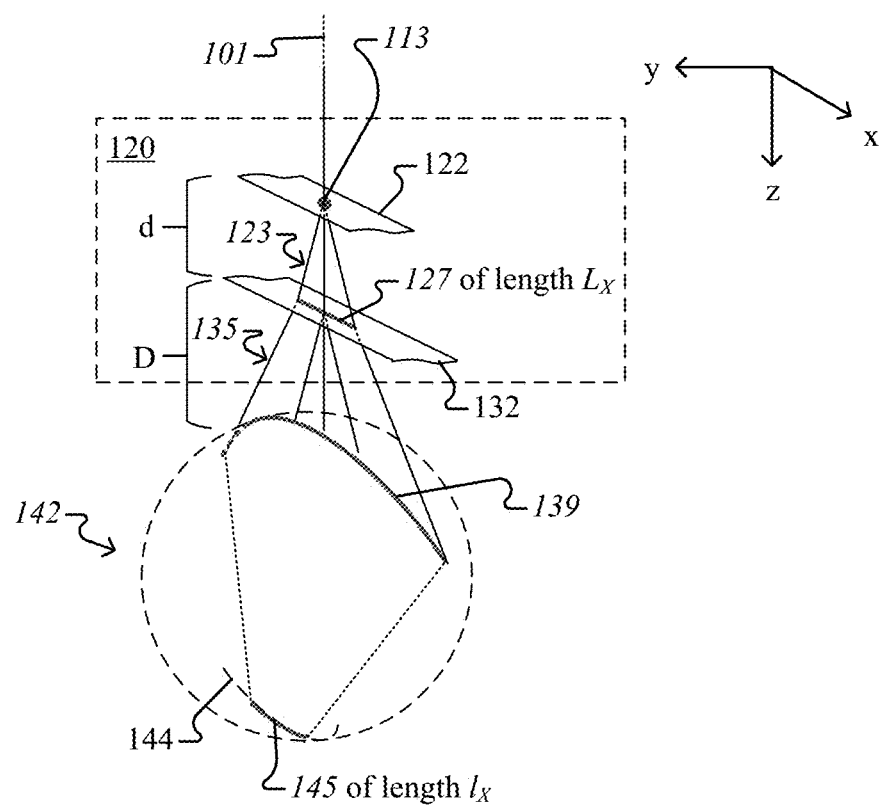

Referring now to FIG. 1B, the illumination-fan generator 120 outputs the planar fan of diffused light 135 during operation of the laser-based illumination-fan source. When an observer looks straight into the generator 120, e.g., the observer's eye 142 being placed on, or in the vicinity of, the optical axis 101, the planar fan 135 intersects the eye along the contour 139. Under these circumstances, the observer sees the light line 127 on the linear diffuser 132, so the observer's eye 142 forms, on the retina 144, an image 145 of the light line. If the line image 145 extends over a length $l_X$ long enough for the light intensity ($\propto$light power/length) imparted to the retina to not exceed a safety threshold, then the observer will not experience discomfort or damage. Here, the safety threshold corresponds to a high level of laser safety. Moreover, to ensure that the light intensity on the retina 145 is below the noted safety threshold, a length $L_X$ of the light line 127 on the linear diffuser 132 must exceed a particular target for a given input light intensity at the beam spot 113. To maximize the C6 safety correction factor in accordance with laser safety standards set forth by the International Electrotechnical Commission (IEC), the length $L_X$ must be at least 10 mm and the diffusion angle must be at least 6°. As such, the length $L_X$ can be 10, 30, 50 or 100 mm. The length $L_X$ of the light line 127 can be controlled by (i) the separation d along the z-axis between the fan-shaped beam generator 122 and the linear diffuser 132, and (ii) the divergence angle of the fan-shaped beam 123. For example, for a given divergence angle, the length $L_X$ increases/decreases when the separation d increases/decreases. As another example, for a given separation d, the length $L_X$ increases/decreases when the divergence angle increases/decreases. Note that in FIG. 1B, the distance D between the observer's eye 142 and the linear diffuser 132, and the separation d between the fan-shaped beam generator 122 and the linear diffuser 132 are not drawn to scale, as the ratio D/d can be as large as 10.

Note that, for an illumination-fan generator having only a fan-shaped beam generator, e.g., the fan-shaped beam generator 122, if the observer were looking straight into the illumination-fan generator, then the observer would see the beam spot 113 on the fan-shaped beam generator 122. As such, the observer's eye 142 would form, on the retina 144, an image of the beam spot 113. For the same given input light intensity at the beam spot 113 discussed above in connection with the illumination-fan generator 120, the light intensity imparted to the retina by the image of the beam spot would most likely exceed the noted safety threshold. As such, the illumination-fan generator 120 can also satisfy a high level of laser safety satisfied by conventional illumination-fan generators, however the disclosed illumination-fan generator uses higher power lasers than the conventional illumination-fan generators. A typical laser profiling device or other machine vision device on the market, which is limited to laser class 3R per the IEC 60825 laser safety standards, is limited to providing a 5 mW-laser beam through a 7 mm aperture positioned 100 mm away from the apparent source, to protect eye safety. In accordance with the foregoing laser safety standards, a C6 correction factor can be applied if the apparent source cannot be imaged to a point on the eye. This factor is determined by the included angle of the source, and how they eye can image it. Assuming the beam is Gaussian and of negligible thickness in the axis transverse to the fan, and that the extended source (i.e., light line 127) is 10 mm long, the C6 would provide, for the laser-based illumination-fan source 102, a corrective factor of ~30 to the AEL (acceptable exposure limit). As such, the laser 110 of the laser-based illumination-fan source 102 could be configured to provide as much as 150 mW-laser beam (30×5) through a 7 mm aperture positioned 100 mm away from the apparent source and still protect eye safety.

Note that although homogenous, an illumination contour 137—formed at an intersection of a planar fan 135, which is output by the laser-based illumination-fan source 102, with an object 190—will still present speckle when imaged by the image acquisition device 140 or observed by an observer under an acute angle (e.g., SA). Improvements described below are capable of reducing the noted speckle.

Figure 2A:
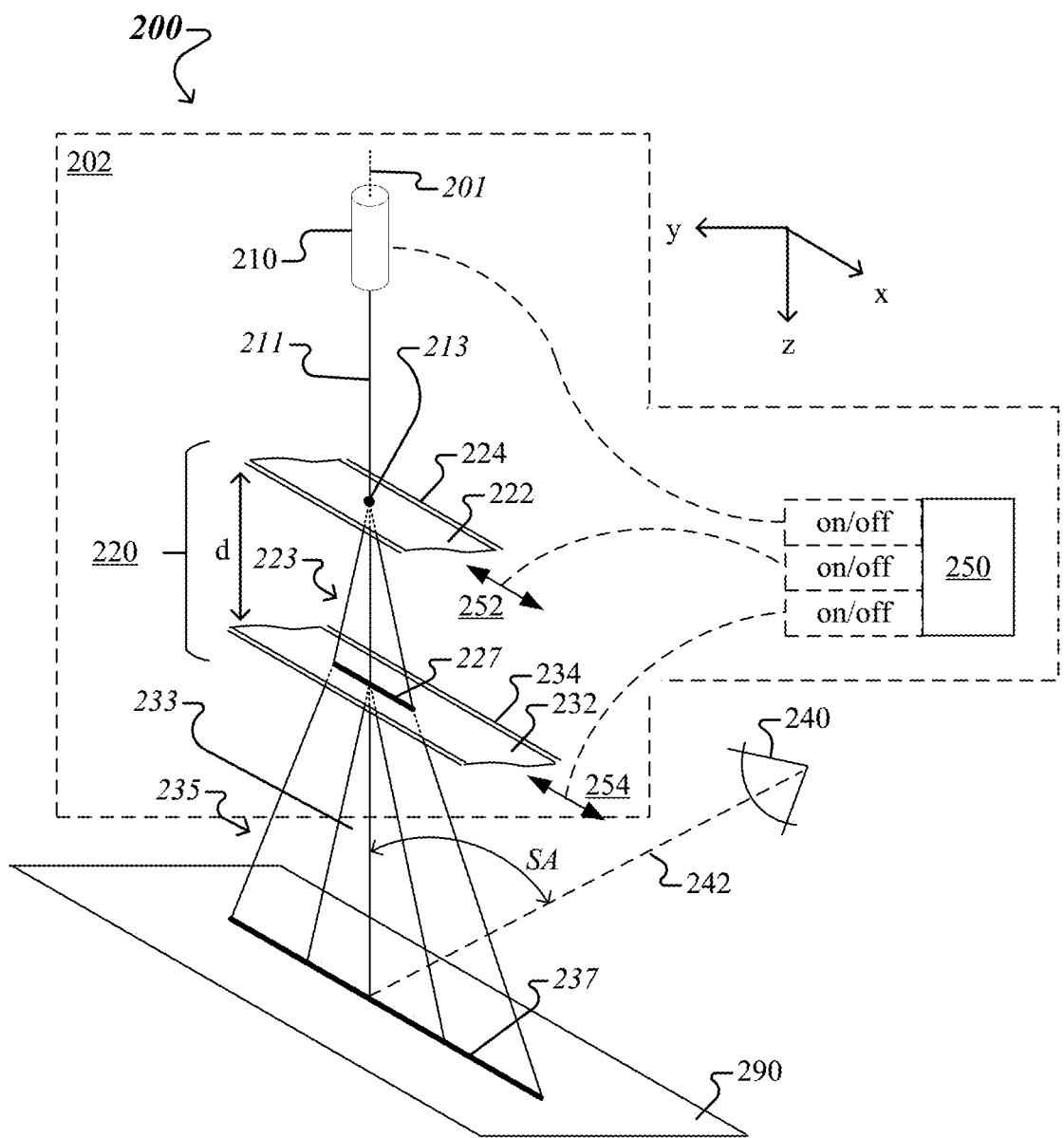
FIGS. 2A-2C show aspects of an example of a laser-based imager that forms a homogenized illumination line, which can be imaged as a low-speckle line.

FIG. 2A shows an example of a laser-based imager 200 that uses a homogenized illumination line 237 which can be imaged (and/or observed) as a low-speckle line. The imager 200 includes a laser-based illumination-fan source 202 and an image acquisition device 240. In some implementations, the image acquisition device 240 can be the image acquisition device 140 described above in connection with FIG. 1A. The source 202 has an optical axis 201, here (for example) oriented along the z-axis, and is configured to output, along the optical axis and parallel to the (x,z) plane, a planar fan of diffused light 235. The planar fan 235 is projected onto an object 290 and forms the illumination line 237 at the intersection of the planar fan 235 with the object 290.

The source 202 includes a laser 210 and an illumination-fan generator 220. In some implementations, the laser 210 can be the laser 110 described above in connection with FIG. 1A. The laser 210 is arranged to emit laser light as a collimated laser beam 211 along the optical axis 201. The illumination-fan generator 220 is arranged and configured to receive the collimated laser beam 211 and to produce the planar fan of diffused light 235.

The illumination-fan generator 220 includes a fan-shaped beam generator 222 having an optical axis common to the optical axis 201, and one or more linear diffusers having a direction of diffusion perpendicular to the optical axis 201, here (for example) along the x-axis. The fan-shaped beam generator 222 and the one or more linear diffusers are distributed along the optical axis 201. The fan-shaped beam generator 222 is arranged and configured to spread the collimated laser beam 211 along the x-axis as a fan-shaped beam 223. In the example shown in FIG. 2A, the illumination-fan generator 220 includes a single linear diffuser 232 that has a direction of diffusion that is also along the x-axis and is spaced apart along the z-axis from the fan-shaped beam generator 222, such that the fan-shaped beam generator 222 is disposed between the laser 210 and the linear diffuser 232. In some implementations, the fan-shaped beam generator 222 and the linear diffuser 232 can be the respective fan-shaped beam generator 122 and the linear diffuser 132 described above in connection with FIG. 1A.

In the example shown in FIG. 2A, during operation of the source 202, at least one of the fan-shaped beam generator 222 and the linear diffuser 232 will be cyclically moved along the direction of diffusion, here (for example) along the x-axis. As such, the fan-shaped beam generator 222 is supported by a first linear stage 224, and the linear diffuser 232 is supported by a second linear stage 234. In some implementations, the first and second linear stages 224, 234 can include one or more of guides, motors, voice coils, piezos, etc. The first linear stage 224 is arranged along the direction of beam expansion, and includes first linear actuators 252 configured to cause the first linear stage to cyclically move the fan-shaped beam generator 222 in the direction of beam expansion. The second linear stage 234 is arranged along the direction of diffusion, and includes second linear actuators 254 configured to cause the second linear stage to cyclically move the linear diffuser 232 in the direction of diffusion.

In the example shown in FIG. 2A, the source 202 also includes a driver 250 coupled with the laser 210 and with either the first linear actuator 252, or the second linear actuator 254, or with both. In other implementations, the driver 250 is external to the source 202 and is coupled with the laser 210 and the first and second linear actuators 252, 254. In this manner, the driver 250 can send control signals to the laser 210 and to the first and second linear actuators 252, 254.

Referring now to operation of the source 202, the laser 210 projects the laser beam 211 onto the fan-shaped beam generator 222 as a beam spot 213. The fan-shaped beam generator 222 transmits light corresponding to the beam spot 213 to form a fan-shaped beam 223 parallel to the (x,z) plane. As such, the fan-shaped beam generator 222 projects the fan-shaped beam 223 onto the linear diffuser 232 as a light line 227 along the x-axis. The linear diffuser 232 transmits light corresponding to the light line 227 to form the planar fan of diffused light 235 parallel to the (x,z) plane. Note that that planar fan 235 is a superposition of fan-shaped beams 233 (which are parallel to the (x,z) plane), each of the fan-shaped beams 233 being formed by the linear diffuser 232 by diffusing light radiated from a corresponding point of the light line 227. As such, the linear diffuser 232 projects the planar fan of diffused light 235 onto the object 290 as the illumination line 237.

Figure 2B:
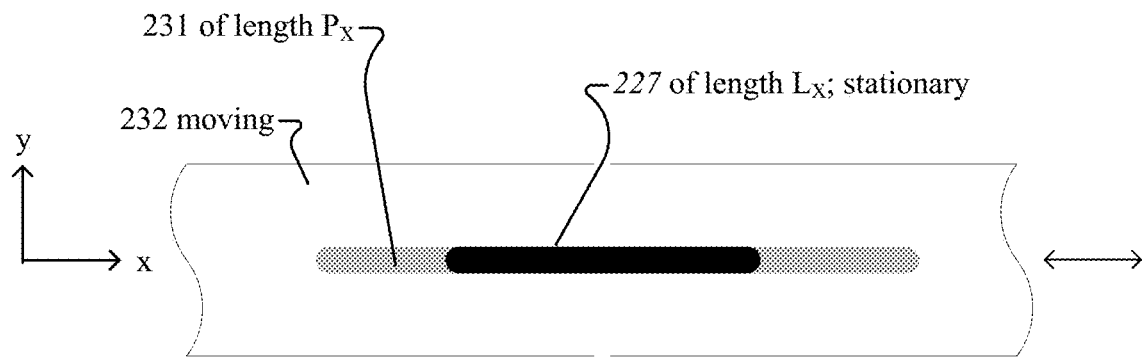

In some implementations, the fan-shaped beam generator 222 is stationary relative the optical axis 201, and the linear diffuser 232 moves cyclically along the x-axis relative the optical axis 201 (e.g., the driver 250 deactivates the first linear actuators 252 and activates the second linear actuators 254). In these cases, the fan-shaped beam generator 222 can be implemented either as (i) a linear diffuser or (ii) one of a Powell lens or a cylindrical lens. Here, the stationary light line 227 will be formed at multiple locations of the moving linear diffuser 232, each location with its own local roughness profile. FIG. 2B shows that when the linear diffuser 232 is moved along the x-axis, the stationary light line 227 will be formed over a first scan path 231 of length $P_X$, which can be 2, 3, 5 or 10 times larger than the length $L_X$ of the stationary light line, such that a local roughness at a "location" of the first scan path is randomly different from local roughness at any other locations of the first scan path. Here, a location of the first scan path 231 has the length $L_X$ of the light line 227. In this manner, multiple instances of the planar fan 235 formed by the moving linear diffuser 232 will be randomly different from each other, so multiple instances of the stationary illumination line 237 formed on the stationary object 290 will also be randomly different from each other. Randomly different speckle patterns corresponding to the multiple instances of the stationary illumination line 237 will average out over an exposure time of the image acquisition device 240, so the stationary illumination line 237 will be imaged by the image acquisition device as a low-speckle line. Note that in this case, the randomness of the speckle patterns corresponding to the multiple instances of the stationary illumination line 237 is caused, at least in part, by the random differences of the surface roughness of the linear diffuser 232 at the different locations of the first scan path 231.

Figure 2C:
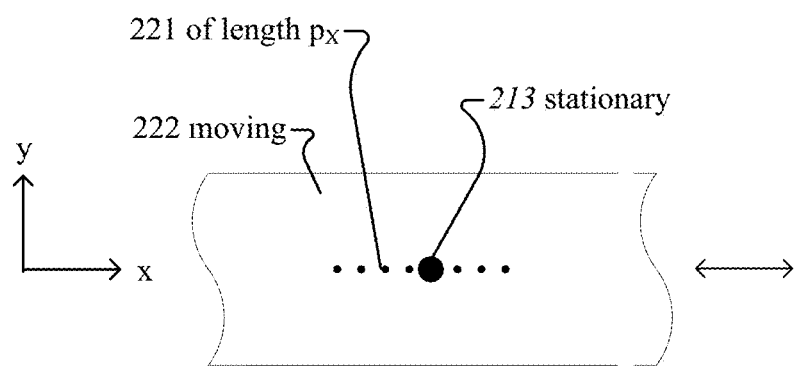

In some implementations, the fan-shaped beam generator 222 moves cyclically along the x-axis relative the optical axis 201, and the linear diffuser 232 is stationary relative the optical axis 201 (e.g., the driver 250 activates the first linear actuators 252 and deactivates the second linear actuators 254). In these cases, the fan-shaped beam generator 222 is implemented as a linear diffuser, and it is referred to as the first linear diffuser 222. In the same context, the linear diffuser 232 is referred to as the second linear diffuser 232. Here, the stationary beam spot 213 will be formed at multiple points of the moving first linear diffuser 222, each point with its own local roughness profile. FIG. 2C shows that when the first linear diffuser 222 is moved along the x-axis, the stationary beam spot 213 will be formed over a second scan path 221 of length $P_x$, which can be 10, 20, 30, 50 or 100 times larger than the diameter of the beam spot, such that a local roughness at a "point" of the second scan path is randomly different from local roughness at any other points of the second scan path. Here, a point of the second scan path 221 has the size of the beam spot 213. In this manner, multiple instances of the fan-shaped beam of diffused light 223 formed by the moving fan-shaped beam generator 222 will be randomly different from each other, so multiple instances of the stationary diffused-light line 227 formed on the stationary second linear diffuser 232 will also be randomly different from each other. As such, multiple instances of the planar fan 235 formed by the stationary second linear diffuser 232 will be randomly different from each other, so multiple instances of the stationary illumination line 237 formed on the object 290 will also be randomly different from each other. Randomly different speckle patterns corresponding to the multiple instances of the stationary illumination line 237 will average out over an exposure time of the image acquisition device 240, so the stationary illumination line 237 will be imaged by the image acquisition device as a low-speckle line. Note that in this case, the randomness of the speckle patterns corresponding to the multiple instances of the stationary illumination line 237 is caused, at least in part, by the random differences of the surface roughness of the first linear diffuser 222 at the different points of the first scan path 221.

In some cases of the latter implementations, both the first linear diffuser 222 and the second linear diffuser 232 move cyclically along the x-axis relative the optical axis 201 (e.g., the driver 250 activates both the first linear actuators 252 and the second linear actuators 254). Here, a phase of the relative motion between the first and second linear diffusers 222, 232 is controlled by the driver 250 to be different from zero, such that the two linear diffusers are in motion relative to each other. In this case, the randomness of the speckle patterns corresponding to the multiple instances of the stationary illumination line 237 is caused, at least in part, by a combination of (i) the random differences of the surface roughness of the first linear diffuser 222 at the different points of the second scan path 221, and (ii) the random differences of the surface roughness of the second linear diffuser 232 at the different locations of the first scan path 231.

Referring again to FIG. 2A, to ensure that the illumination line 237 can be imaged as a low-speckle line, the driver 250 causes the first linear stage 224 to hold the fan-shaped beam generator 222 stationary relative the optical axis 201, and the second linear stage 234 to cyclically move the linear diffuser 232, relative to the optical axis 201 and along the x-axis, with a predetermined frequency. When the fan-shaped beam generator 222 is implemented as a first linear diffuser 222, to ensure that the illumination line 237 can be imaged as a low-speckle line, the driver 250 causes the first linear stage 224, or the second linear stage 234, or both to cyclically move the first linear diffuser 222 and the second linear diffuser 232, relative to each other and along the x-axis, with a predetermined frequency. In either of these cases, the predetermined frequency of the relative motion can be in the range of 0.5-500 Hz. A particular value of the relative motion frequency f can be chosen based on the required exposure time Δt coupled with the range of travel ΔX (e.g., along the first scan path 231 or second scan path 221) required to reduce speckle contrast C. The types of structured linear diffusers used, e.g., in the illumination-fan generator 220 have features of size on the order of 10-50 μm. To achieve a Δt=5 ms (200 Hz) exposure with a C=10% speckle contrast, the image acquisition device 240 averages $$N = \frac{1}{C^2} = 100$$

independently random speckle patterns in 5 ms, or 20000 per second. With the speckle pattern changing roughly every micron traveled along the first scan path 231 and/or the second scan path 221, i.e., δx=1 μm. Note that the foregoing parameters satisfy the following equality:

$$\frac{N}{\Delta t} = \frac{\Delta X}{\delta x} f \qquad (1)$$

According to EQ. (1), a travel ΔX of roughly 1 mm would be sufficient at a relative motion frequency f=20 Hz, for example. These and other examples determined using EQ. 1, for various values of the travel-per-pattern δx, relative motion frequency, and range of travel, are summarized in Table 1.

TABLE 1

| N | Δt (ms) | δx (μm) | f (Hz) | ΔX (mm) |
|---|---|---|---|---|
| 100 | 5 | 1 | 20 | 1 |
| 100 | 5 | 1 | 2 | 10 |
| 100 | 5 | 1 | 1 | 20 |
| 100 | 5 | 10 | 20 | 10 |
| 100 | 5 | 10 | 2 | 100 |
| 100 | 5 | 10 | 1 | 200 |

In some implementations, in addition to activating either the first linear actuators 252, or the second linear actuators 254, or both, the driver 250 can strobe the laser 210 by activating/deactivating the laser in the following manner. For simplicity, strobing will be explained for the situation when the driver 250 deactivates the first linear actuators 252 and activates the second linear actuators 254, so the fan-shaped beam generator 222 is stationary, and the linear diffuser 232 is in motion, relative the optical axis 201. Here, the driver 250 can activate the laser 210 when a speed of the linear diffuser 232 exceeds a predetermined speed, and deactivate the laser when the linear diffuser has a speed smaller than the predetermined speed. Such slowdown conditions occur when the linear diffuser 232 changes direction as part of the motion cycle. Strobing the laser 210 in this manner ensures that a sufficiently large number of random speckle patterns are averaged even for very short exposure times.

It was noted above that parameters to be used for optimizing de-speckling quality of the illumination line 237 are a frequency of the motion of the diffuser 232 relative the fan-shaped beam generator 222; and a measure of random differences of (i) the surface roughness of the (second) linear diffuser 232 at different locations of the first scan path 231, and/or (ii) the surface roughness of the first linear diffuser 222 at different points of the second scan path 221. Another parameter to be used for optimizing de-speckling quality of the illumination line 237 is a difference between a divergence angle corresponding to the fan-shaped beam generator 222 (e.g., a first diffusion angle corresponding to the first linear diffuser 222) and a second diffusion angle corresponding to the (second) linear diffuser 232. For example, the divergence (first diffusion) angle is 5° and the (second) diffusion angle is 40°. In general, the difference between the divergence (first diffusion) angle of the fan-shaped beam generator (first linear diffuser) 222 and the (second) diffusion angle of the (second) linear diffuser 232 can be 1%, 5%, 10%, 50%, 100%, 500% or 1000%. This is because the main function of the (second) linear diffuser 232 is to significantly increase homogeneity of, and reduce speckle from, the light line 127 projected by the fan-shaped beam generator (first linear diffuser) 222 onto the (second) linear diffuser. Note that it is the fine structure and pseudo-random nature of the linear diffusers 222, 232 that causes enhanced uniformity and lower speckle contrast. Yet another parameter to be used for optimizing de-speckling quality of the illumination line 237 is a spacing d between the fan-shaped beam generator 222 and linear diffuser 232. For example, the spacing d between the fan-shaped beam generator 222 and linear diffuser 232 can be 1, 2, 3, 5, 20, 50 or 100 mm. Note that the spacing d between the fan-shaped beam generator 222 and second linear diffuser 232 is specified to optimize not only de-speckling quality of the illumination line 237, but also a volume and/or apparent size of a package for enclosing the generator 220, for instance.

The arrangement and functionality of the image acquisition device 240 is similar to the arrangement and functionality of the image acquisition device 140 described above in connection with FIG. 1A. Here, the image acquisition device 240 is arranged and configured to image the object 290 as illuminated with the illumination line 237. An optical axis 242 of the image acquisition device 240 is arranged in the (y,z) plane and forms an acute angle SA with the optical axis 201 of the laser-based illumination-fan source 202. The image acquisition device 240 includes an image sensor and an optical subsystem that forms an image of the illumination line 237 on the image sensor. Note that, because of the way in which the illumination line 237 has been produced by the source 202, the image of the illumination line 237 formed, over an exposure time, is homogenized and speckle-free. The image sensor of the image acquisition device 240 is configured to convert the image of the illumination line 237 into information for producing a digital image of the line-illuminated object 290.

A way to optimize complexity of a laser-based illumination-fan source (e.g., 102 or 202), e.g., to simplify its components, such as the illumination-fan generator (e.g., 120 or 220) and the driver (e.g., 250), is described next.

Figure 3:
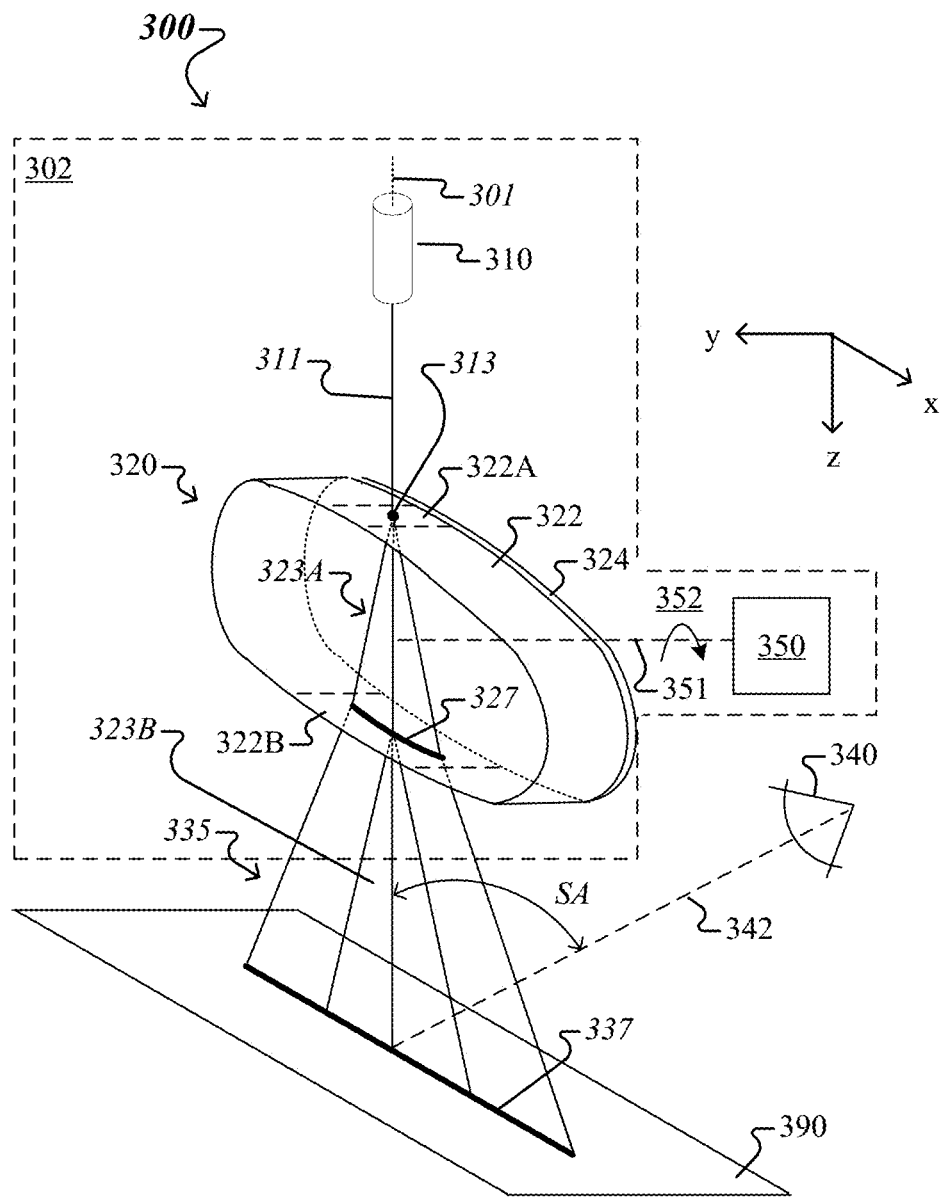
FIG. 3 shows another example of a laser-based imager that forms a homogenized illumination line, which can be imaged as a low-speckle line.

FIG. 3 shows another example of a laser-based imager 300 that uses a homogenized illumination line 337 which can be imaged (and/or observed) as a low-speckle line. The imager 300 includes a laser-based illumination-fan source 302 and an image acquisition device 340. In some implementations, the image acquisition device 340 can be either one of the image acquisition devices 140 or 240 described above in connection with FIG. 1A or 2A. The source 302 has an optical axis 301, here (for example) oriented along the z-axis, and is configured to output, along the optical axis and parallel to the (x,z) plane, a planar fan of diffused light 335. The planar fan 335 is projected onto an object 390 and forms the illumination line 337 at the intersection of the planar fan with the object.

The source 302 includes a laser 310 and an illumination-fan generator 320. In some implementations, the laser 310 can be either one of the lasers 110 or 210 described above in connection with FIG. 1A or 2A. The laser 310 is arranged to emit laser light as a collimated laser beam 311 along the optical axis 301. The generator 320 is arranged and configured to receive the collimated laser beam 311 and to produce the planar fan of diffused light 335.

The generator 320 includes a linear diffuser 322 supported by a cylindrically-shaped rotation stage 324. Here, the cylindrically-shaped rotation stage 324 has a rotational axis 351 perpendicular to the optical axis 301, and a cross-section parallel to the (y,z) plane that is shaped like a circle. In the example shown in FIG. 3, the rotational axis 351 of the rotation stage 324 is parallel to the y-axis. The linear diffuser 322 is attached over the entire circumference of the side surface of the rotation stage 324 and, hence, forms a cylindrically-shell shaped linear diffuser with a direction of diffusion that is tangential to the cylindrical shell.

In the example shown in FIG. 3, during operation of the source 302, the cylindrically-shell shaped linear diffuser 322 will be rotated about the y-axis, i.e., the cylindrically-shell shaped linear diffuser will be rotated in the direction of diffusion. As such, the rotation stage 324 includes rotation actuators 352 configured to cause the rotation stage to rotate the cylindrically-shell shaped linear diffuser 322 in the direction of diffusion. Here, the source 302 also includes a driver 350 configured to communicate with the rotation actuators 352. In other implementations, the driver 350 is external to the source 302 and communicates with the rotation actuators 352 through a corresponding communication channel.

In some implementations, the diffusive properties of the cylindrically-shell shaped linear diffuser 322 can be the same or similar to the diffusive properties of one of (i) the linear diffusers 122 and 132 described above in connection with FIG. 1A, and (ii) the linear diffusers 222 and 232 described above in connection with FIG. 2A. Also, the cylindrically-shaped rotation stage 324 is configured to transmit light emitted by the laser 310. For example, the cylindrically-shaped rotation stage 324 can include a material, e.g., glass or a plastic, which is transparent to the laser light. As another example, the cylindrically-shaped rotation stage 324 can have a slot parallel to the plane (x-z) and be filled with a medium (e.g., air, glass, plastic, etc.) that can transmit laser light through the rotation stage.

Referring now to operation of the source 302, the laser 310 projects the laser beam 311 onto an input portion 322A of cylindrically-shell shaped linear diffuser 322 as a beam spot 313. Note that the direction of diffusion of the cylindrical-shell shaped linear diffuser 322 for the input portion 322A is along the x-axis. For this reason, the input portion 322A transmits light corresponding to the beam spot 313 to form a fan-shaped beam 323A parallel to the (x,z) plane. As such, the input portion 322A projects the fan-shaped beam 323A onto an output (diametrically opposite) portion 322B of cylindrical-shell shaped linear diffuser 322 as a diffused-light contour 327 along the x-axis. Note that the direction of diffusion of the cylindrically-shell shaped linear diffuser 322 for the output portion 322B is also along the x-axis, because the output portion 322B is diametrically opposite to the input portion 322A. For this reason, the output portion 322B transmits light corresponding to the diffused-light contour 327 to form the planar fan of diffused light 335 parallel to the (x,z) plane. Note that that planar fan 335 is a superposition of fan-shaped beams 323B (which are parallel to the (x,z) plane), each of these fan-shaped beams being formed by the output portion 322B by diffusing light radiated from a corresponding point of the diffused-light contour 327. As such, the output portion 322B projects the planar fan of diffused light 335 onto the object 390 as the illumination line 337.

During operation of the source 302, the driver 350 activates the rotation actuators 352, which in turn cause the rotation stage 324 to rotate the cylindrical-shell shaped linear diffuser 322 about the y-axis, such that its input portion 322A and output portion 322B are continuously moving in opposite directions. In this manner, the stationary (relative to the optical axis 301) beam spot 313 will be formed at multiple points of the moving (relative to the optical axis 301) input portion 322A, each point with its own local roughness profile. As such, multiple instances of the unitary planar fan 323A formed by the moving input portion 322A will be randomly different from each other, so multiple instances of the stationary (relative to the optical axis 301) diffused-light contour 327 formed on the moving (relative to the optical axis 301) output portion 322B will also be randomly different from each other. Moreover, each of the multiple instances of the stationary diffused-light contour 327 will be formed at different locations of the moving output portion 322B, each location with its own local roughness profile. As such, multiple instances of the planar fan 335 formed by the moving output portion 322B will be randomly different from each other, so multiple instances of the stationary illumination line 337 formed on the stationary object 390 will also be randomly different from each other. The randomly different speckle patterns corresponding to the multiple instances of the stationary illumination line 337 will average out over an exposure time of the image acquisition device 340, so the stationary illumination line 337 will be imaged by the image acquisition device as speckle-free line. Note that in this case, the randomness of the speckle patterns corresponding to the multiple instances of the stationary illumination line 337 is caused, at least in part, by a combination of (i) the random differences of the surface roughness at the different points of the input portion 322A, and (ii) the random differences of the surface roughness at the different locations of the output portion 322B.

To ensure that the illumination line 337 can be imaged as a low-speckle line, the driver 350 causes the rotation stage 324 to rotate the cylindrical-shell shaped linear diffuser 322 with a predetermined rotation frequency. In this manner, the input portion 322A and the output portion of the cylindrical-shell shaped linear diffuser continuously move relative to each other, along the x-axis, with a predetermined speed. The predetermined rotation frequency is proportional to the ratio of the predetermined speed and the diameter of the cylindrical-shell shaped linear diffuser 322 (i.e., the distance along the z-axis between the input portion 322A and the output portion 322B.) For a diameter in the range of 5-25 mm, the predetermined rotation frequency can be in the range of 50-500 Hz. A particular value of the diameter of the cylindrical-shell shaped linear diffuser 322, and the rotation frequency can be chosen based on a balance of the diffuser material chosen, the eye safety level required, and the fan angle (of the planar fan of diffused light 235) desired in the field. For example, 30° (+/−15°) linear diffusing material can be wrapped around a 20 mm-diameter rod lens of glass (e.g., N-SF8 material). The input beam 313 to the rod lens-based illumination-fan generator 320 would be spread roughly +/−5 mm (corresponding to a 10 mm diffused-light contour 327) by the time it reached the exit face 322B of the rod. The optical power of the exit face 322B of the rod "straightens out" the fan-shaped beam 323A, bringing it towards a collimated condition. Then the final surface passed through is the 30° linear diffusing material on the exit face 322B, providing, for laser safety purposes, the extended source condition on the exit face, and homogenizing the planar fan of diffused light 235. The rotation frequency with which the cylindrical-shell shaped linear diffuser 322 is to be rotated to reduce speckle contrast to a predetermined level can be determine as described above in connection with FIG. 2A.

The arrangement and functionality of the image acquisition device 340 is similar to the arrangement and functionality of the image acquisition device 140 or 240 described above in connection with FIG. 1A or 2A. Here, the image acquisition device 340 is arranged and configured to image the object 390 as illuminated with the illumination line 337. An optical axis 342 of the image acquisition device 340 is arranged in the (y,z) plane and forms an acute angle SA with the optical axis 301 of the laser-based illumination-fan source 302. The image acquisition device 340 includes an image sensor and an optical subsystem that forms an image of the illumination line 337 on the image sensor. Note that, because of the way in which the illumination line 337 has been produced by the source 302, the image of the illumination line 337, formed over an exposure time, is homogenized and speckle-free. The image sensor of the image acquisition device 340 is configured to convert the image of the illumination line 337 into information for producing a digital image of the line-illuminated object 390.

In conclusion, the disclosed technologies use a laser that emits laser light, a fan-shaped beam generator and one or more linear diffusers, without or with relative motion between them, for illuminating an object with a line of the laser light. Here, the fan-shaped beam generator can itself be a linear diffuser, or either a Powell lens or a cylindrical lens. The illumination line produced in accordance with the disclosed technologies is homogenized and can be imaged (and/or observed) as a low-speckle line for the following reasons. The angular diversity provided by the one or more linear diffusers homogenizes the laser light along their common diffusion direction to avoid diffractive defects and reduce sparkle on objects illuminated with the homogenized illumination line. The relative motion of the linear diffusers causes changes of a speckle pattern of the illumination line during an exposure time without affecting the width of the illumination line along a transverse direction (perpendicular to the diffusion direction). Moreover, the spatial profile of the illumination line along the transverse direction remains the Gaussian profile of the emitted laser light. In this manner, the illumination line, at any slice taken along the propagation direction, which is perpendicular to the diffusion direction and the transverse direction, will have the original Gaussian profile along the transverse direction, and, in the diffusion direction will be homogenized, and will have a predictable line length controlled by the diffusion angles of the two or more linear diffusers.

A few embodiments have been described in detail above, and various modifications are possible. The disclosed subject matter, including the functional operations described in this specification, can be implemented in electronic circuitry, computer hardware, firmware, or in combinations of them, such as the structural means disclosed in this specification and structural equivalents thereof.

For example, a driver (e.g., 150, 250, 350) can include at least data processing apparatus and medium. The data processing apparatus can be one or more hardware processors, e.g., central processing units (CPUs), graphic processing units (GPUs), or combinations thereof, which can each include multiple processor cores. The medium is computer-readable medium that can include both volatile and non-volatile memory, such as Random Access Memory (RAM) and Flash RAM, for instance. The medium encodes instructions, that when executed by the data processing apparatus, cause the driver to implement aspects of processes disclosed herein, for instance. The connector(s) (shown in dashed line in FIGS. 1A, 2A and 3) can be one or more of USB connectors, Ethernet connectors, or other network connectors. In general, the connector(s) can represent any data communication link(s) and power transfer link(s), or combination thereof, implemented via physical cables or wirelessly.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A system comprising
    a laser configured to emit a collimated laser beam;
    an illumination-fan generator that comprises a fan-shaped beam generator and a linear diffuser, wherein the illumination-fan generator is arranged and configured to
        receive the collimated laser beam,
        output a planar fan of diffused light, such that the planar fan of diffused light emanates from a light line formed on the linear diffuser, and cause formation of an illumination line at an intersection of the planar fan of diffused light and an object; and
    an image acquisition device disposed such that its optical axis forms an acute angle to the planar fan of diffused light, and configured to form an image of the illumination line,
    wherein the image comprises an average of a sequence of images of instances of the illumination line formed during an exposure time interval.

2. The system of claim 1,
    wherein the fan-shaped beam generator is arranged and configured to receive the collimated laser beam and form a fan-shaped beam that intersects the linear diffuser along the light line parallel to a direction of diffusion of the linear diffuser, and
    wherein the linear diffuser transmits light corresponding to the light line to form the planar fan.

3. The system of claim 1, wherein the fan-shaped beam generator comprises a linear diffuser.

4. The system of claim 1, wherein the linear diffuser comprises one of a pseudorandom cylinder array or a holographic optical element.

5. The system of claim 1, wherein the fan-shaped beam generator comprises one of a cylindrical lens or a Powell lens.

6. The system of claim 1, wherein
    a divergence angle of a fan-shaped beam formed by the fan-shaped beam generator is larger than a target divergence angle, and
    a separation (d) between the fan-shaped beam generator and the linear diffuser is larger than a predetermined separation to ensure that a length ($L_x$) of the light line formed by the fan-shaped beam on the linear diffuser is larger than a target length, the predetermined separation being proportional to the target divergence angle and the target length.

7. The system of claim 1, comprising a driver configured to cause cyclical motion of the linear diffuser relative to the fan-shaped beam generator, the cyclical motion being along a direction of diffusion of the linear diffuser.

8. The system of claim 7, wherein
    the driver is configured to deactivate the laser when a speed of the cyclical motion is below a predetermined speed, and
    the predetermined speed is inversely proportional to the exposure interval.

9. The system of claim 1, wherein
    the image acquisition device is configured to form an image of the illumination line as a homogenized line.

10. A system comprising:
    a laser configured to emit a collimated laser beam; and
    an illumination-fan generator that comprises at least one linear diffuser having a direction of diffusion, wherein the illumination-fan generator is arranged and configured to
        receive the collimated laser beam,
        output a planar fan of diffused light, such that the planar fan of diffused light emanates from a light line formed on a distal-most of the at least one linear diffuser, and
        cause formation of an illumination line at an intersection of the planar fan of diffused light and an object; and
    wherein the at least one linear diffuser comprises a cylindrical-shell shaped linear diffuser arranged with its axis perpendicular to a direction of propagation of the collimated laser beam, and configured to
        receive the collimated laser beam at an input portion of the cylindrical-shell shaped linear diffuser, form a fan-shaped beam that intersects an exit portion of the cylindrical-shell shaped linear diffuser along the light line parallel to the direction of diffusion, and transmit through the exit portion light corresponding to the light line to form the planar fan.

11. The system of claim 10, wherein the at least one linear diffuser comprises one of a pseudorandom cylinder array or a holographic optical element.

12. The system of claim 10, wherein
a divergence angle of a fan-shaped beam formed by an input portion of the cylindrical-shell shaped linear diffuser is larger than a target divergence angle, and
a diameter of the cylindrical-shell shaped linear diffuser is larger than a predetermined diameter to ensure that a length ($L_X$) of a diffused-light contour formed by the fan-shaped beam on the exit portion of the cylindrical-shell shaped linear diffuser is larger than a target length, the predetermined diameter being proportional to the target divergence angle and the target length.

13. The system of claim 10, comprising a driver configured to cause rotation of the cylindrical-shell shaped linear diffuser about its axis, the rotation being along a direction of diffusion of the cylindrical-shell shaped linear diffuser.

14. The system of claim 13, comprising
an image acquisition device disposed such that its optical axis forms an acute angle to the planar fan of diffused light, and configured to form an image of an illumination line as a de-speckled image,
wherein the de-speckled image comprises an average of a sequence of images of instances of the illumination line formed during an exposure time interval.

15. The system of claim 10, comprising
an image acquisition device disposed such that its optical axis forms an acute angle to a planar fan of diffused light, and configured to form an image of the illumination line as a homogenized line.

16. The system of claim 1, wherein the linear diffuser has random differences in surface roughness at different locations of a scan path.

17. The system of claim 16, wherein the linear diffuser comprises one of a pseudorandom cylinder array or a holographic optical element.

18. The system of claim 16, comprising a driver configured to cause cyclical motion of the linear diffuser relative to the fan-shaped beam generator, the cyclical motion being along a direction of diffusion of the linear diffuser.

* * * * *